(12) United States Patent
Nakai et al.

(10) Patent No.: US 11,451,302 B2
(45) Date of Patent: Sep. 20, 2022

(54) TRANSMITTER OPTICAL SUBASSEMBLY AND OPTICAL MODULE

(71) Applicant: Lumentum Japan, Inc., Kanagawa (JP)

(72) Inventors: Yoshihiro Nakai, Kanagawa (JP); Atsushi Nakamura, Nagano (JP); Hideaki Asakura, Kanagawa (JP)

(73) Assignee: Lumentum Japan, Inc., Kanagawa (JP)

( * ) Notice: Subject to any disclaimer, the term of this patent is extended or adjusted under 35 U.S.C. 154(b) by 833 days.

(21) Appl. No.: 16/214,332

(22) Filed: Dec. 10, 2018

(65) Prior Publication Data

US 2019/0190611 A1 Jun. 20, 2019

(30) Foreign Application Priority Data

Dec. 18, 2017 (JP) .............................. JP2017-241787

(51) Int. Cl.
| | |
|---|---|
| *H04B 10/40* | (2013.01) |
| *H04B 10/516* | (2013.01) |
| *G02F 1/01* | (2006.01) |
| *G02F 1/17* | (2019.01) |
| *H04B 10/588* | (2013.01) |
| *H04B 10/50* | (2013.01) |
| *G02F 1/015* | (2006.01) |

(52) U.S. Cl.
CPC ......... *H04B 10/516* (2013.01); *G02F 1/0121* (2013.01); *G02F 1/0157* (2021.01); *G02F 1/17* (2013.01); *H04B 10/40* (2013.01); *H04B 10/504* (2013.01); *H04B 10/588* (2013.01)

(58) Field of Classification Search
CPC ..... H04B 10/50; H04B 10/516; G02F 1/0121; G02F 1/17
See application file for complete search history.

(56) References Cited

U.S. PATENT DOCUMENTS

| | | | |
|---|---|---|---|
| 5,317,581 A | 5/1994 | Onishi et al. | |
| 5,347,601 A * | 9/1994 | Ade .................. | G02B 6/12004 |
| | | | 385/14 |

(Continued)

FOREIGN PATENT DOCUMENTS

| | | | | |
|---|---|---|---|---|
| CN | 2917038 Y | 6/2007 | | |
| EP | 2487763 A1 * | 8/2012 | ........... | H01S 5/0265 |

(Continued)

*Primary Examiner* — Dzung S Tran
(74) *Attorney, Agent, or Firm* — Harrity & Harrity, LLP

(57) ABSTRACT

A transmitter optical subassembly may include an optical modulator for modulating output light from the light source. The optical modulator has a characteristic that a current depending on amount of optical absorption has a positive correlation with an applied voltage thereto. The transistor at the second terminal is connected in series to the optical modulator. A drive voltage applied to the optical modulator and the transistor is divided into a first voltage applied to the optical modulator and a second voltage applied to the transistor. A drive current flowing through the optical modulator and the transistor depends on the control signal input to the first terminal. The first voltage is based on the drive current and is subject to the characteristic of the optical modulator. The second voltage fluctuates in response to the first voltage.

20 Claims, 7 Drawing Sheets

(56) References Cited

U.S. PATENT DOCUMENTS

| | | | |
|---|---|---|---|
| 5,506,716 A * | 4/1996 | Mihara | H04B 10/1125 |
| | | | 398/136 |
| 5,706,116 A | 1/1998 | Sugata | |
| 5,706,117 A * | 1/1998 | Imai | H04B 10/25137 |
| | | | 398/197 |
| 7,099,596 B2 | 8/2006 | Watanabe et al. | |
| 8,787,764 B2 | 7/2014 | Fukasaku et al. | |
| 2004/0028099 A1 | 2/2004 | Hongo et al. | |
| 2013/0016745 A1 * | 1/2013 | Moto | H01S 5/0428 |
| | | | 372/29.011 |
| 2013/0084065 A1 | 4/2013 | Ishii | |
| 2016/0119062 A1 | 4/2016 | Christensen | |
| 2017/0153319 A1 * | 6/2017 | Villeneuve | G01S 7/4804 |
| 2018/0031676 A1 | 2/2018 | Sadhu | |

FOREIGN PATENT DOCUMENTS

| | | |
|---|---|---|
| JP | H0572505 A | 3/1993 |
| JP | H05129697 A | 5/1993 |
| JP | H08316580 A | 11/1996 |
| JP | H09181682 A | 7/1997 |
| JP | 2003279908 A | 10/2003 |
| JP | 2004-061556 A | 2/2004 |
| JP | 2004287071 A | 10/2004 |
| JP | 2008113321 A | 5/2008 |
| JP | 2013-076776 A | 4/2013 |
| JP | 2014163971 A | 9/2014 |

* cited by examiner

TRANSMITTER OPTICAL SUBASSEMBLY AND OPTICAL MODULE

CROSS-REFERENCE TO RELATED APPLICATION

The present application claims priority from Japanese application JP2017-241787 filed on Dec. 18, 2017, the content of which is hereby incorporated by reference into this application.

BACKGROUND

1. Field

This relates to transmitter optical subassemblies and optical modules.

2. Description of the Related Art

Optical communication systems require a greater capacity and a lower cost of information transmission. Consequently, optical transmitter modules require speeding up or downsizing. The optical transmitter modules are configured mainly to generate modulation signals corresponding to information to be transmitted. Modulation methods of the optical transmitter modules include a direct modulation system of directly modulating optical output intensity of a laser diode (LD) as a signal light source and an external modulation system of modulating a constant optical output from a laser diode by an external optical modulator. The modulator in the external modulation system includes an electro-absorption optical modulator (EA modulator) and Mach-Zehnder optical modulator (MZ modulator).

The EA modulator is configured to have Multiple Quantum Well (MQW) structure made from semiconductors and interposed between p-type and n-type conductors, controlling output light intensity by utilizing a phenomenon of absorbing light at a longer-wavelength, depending on more voltages applied to the quantum well, thereby changing absorption amount of incident light intensity.

The EA modulator changes its modulation characteristics or extinction ratios due to external factors such as temperature and input light power (LD optical output power). To keep a desired characteristic in spite of the external factors, a feedback control may be used together. For example, JP 2013-76776A discloses an example to keep an optical waveform unchanged by detecting a current (photocurrent) flowing through the EA modulator and controlling a drive voltage to be applied to the EA modulator. JP 2004-61556A discloses an example of detecting temperature of a semiconductor LD module including the EA modulator and controlling a voltage to be applied to the EA modulator, depending on the temperature.

In spite of change of external factors such as temperature, the EA modulator in operation needs to stabilize the extinction ratio or the optical output to ensure normal communication. One of typical solutions therefor is feedback control, specifically a way of detecting a current flowing through an EA portion, i.e. a photocurrent, and controlling voltages applied to the EA portion. However, the photocurrent used there is a time-averaged one, not accurately detecting the photocurrent at high- and low-level points, making the extinction ratio control difficult when the extinction characteristic non-linearly varies due to temperature change. Such a problem may be solved by feed-forward control to set an appropriate correction value after measuring changes of extinction ratios and optical outputs due to external factors. However, this is likely to require individual adjustment, leading to a cost disadvantage in a field of mass production.

SUMMARY

This is to aim at stabilizing a characteristic of a modulator with a simple structure.

(1) A transmitter optical subassembly may include a light source; an optical modulator for modulating output light from the light source, the optical modulator having a characteristic that a current depending on amount of optical absorption has a positive correlation with an applied voltage thereto; and a transistor with a first terminal, a second terminal, and a third terminal, configured to pass a current between the second terminal and the third terminal in response to a control signal input to the first terminal. The transistor at the second terminal is connected in series to the optical modulator. A drive voltage applied to the optical modulator and the transistor is divided into a first voltage applied to the optical modulator and a second voltage applied to the transistor. A drive current flowing through the optical modulator and the transistor depends on the control signal input to the first terminal. The first voltage is based on the drive current and is subject to the characteristic of the optical modulator. The second voltage fluctuates in response to the first voltage.

The characteristic of the modulator can be stabilized with a simple structure using a transistor.

(2) In the transmitter optical subassembly according to (1), the transistor may be a field-effect transistor, and the control signal is a voltage signal.

(3) The transmitter optical subassembly according to (1) or (2) may further include a submount. The light source and the optical modulator are mounted on the submount.

(4) In the transmitter optical subassembly according to (3), the transistor may also be mounted on the submount.

(5) The transmitter optical subassembly according to (3) may further include a relay board. The transistor is mounted on the relay board.

(6) An optical module may include the transmitter optical subassembly according to any one of (1) to (5) and a receiver optical subassembly.

DETAILED DESCRIPTION

Hereinafter, some embodiments will be described with reference to drawings, where the same element or an equivalent element bears the same reference number and repetitive description thereof will be omitted.

Figure 1:
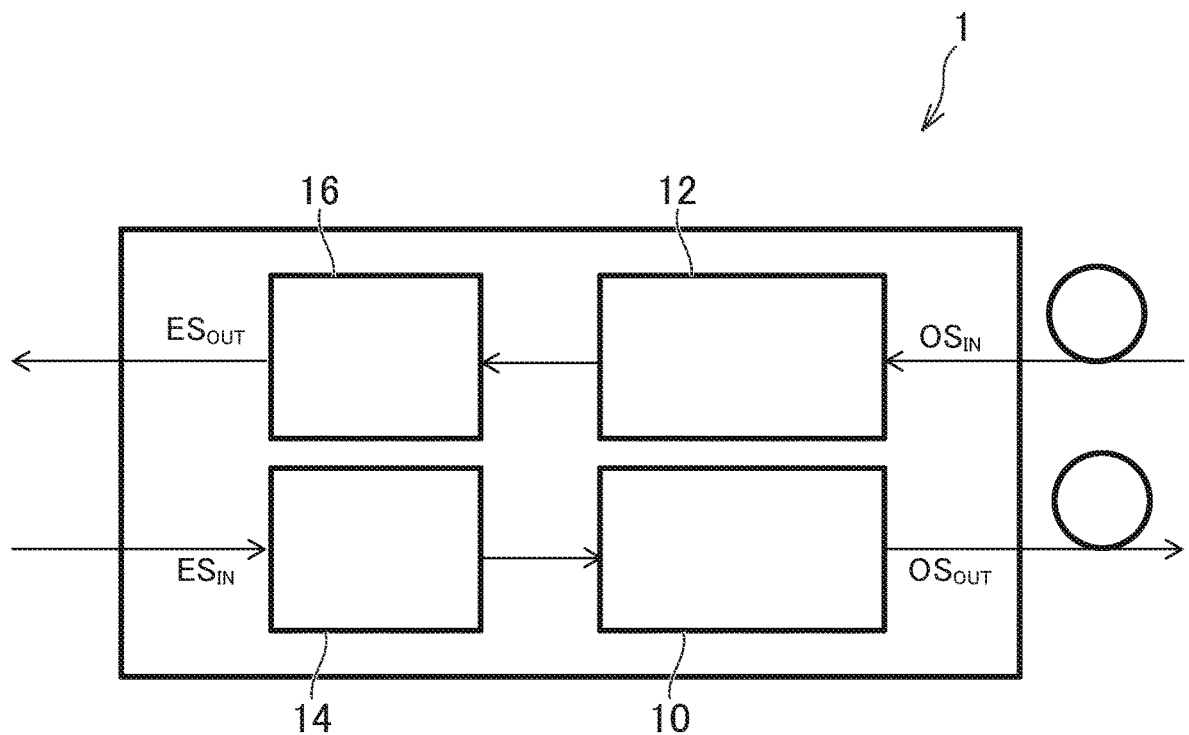
FIG. 1 is a schematic view of an optical module including a transmitter optical subassembly in an embodiment.

FIG. 1 is a schematic view of an optical module 1 including a transmitter optical subassembly in an embodiment. The optical module 1 is an optical transceiver, which includes a transmitter optical subassembly (TOSA) 10 with an optical transmitting function and a receiver optical subassembly (ROSA) 12 with an optical receiving function. The optical module 1 is configured to exchange electric signals at an external host device. A high-frequency electrical input signal $ES_{IN}$ to be transmitted may be input to the transmitter optical subassembly 10 through a driver IC (integrated circuit) 14 and an unillustrated clock data recovery (CDR), converted into an optical output signal $OS_{OUT}$ by the transmitter optical subassembly 10, and transmitted to an external optical fiber. Conversely, the receiver optical subassembly 12, which receives an optical input signal $OS_{IN}$ input from another external optical fiber, converts it into a high-frequency electric signal. The converted electric signal may be amplified by an amplifier 16 and output to the external host device, as an electrical output signal $ES_{OUT}$.

Figure 2:
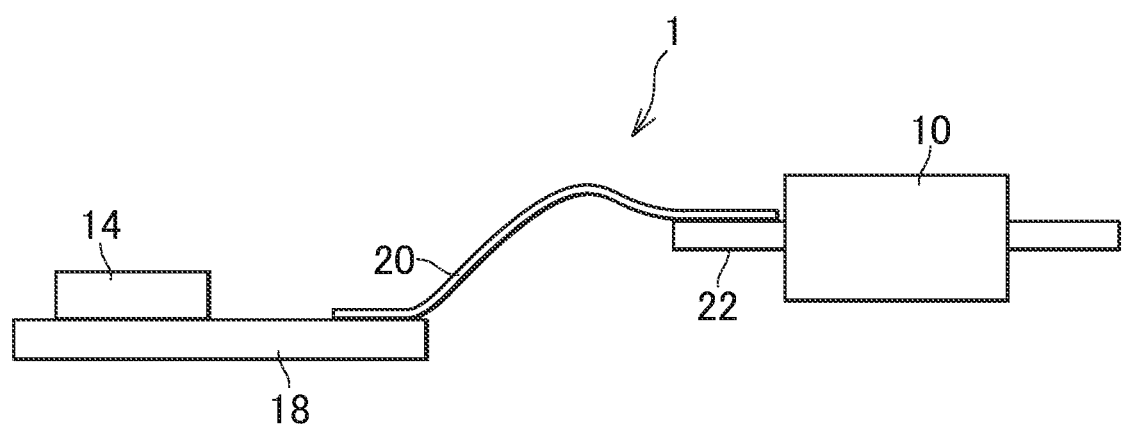
FIG. 2 is a schematic view of an interior of the optical module in FIG. 1.

FIG. 2 is a schematic view of an interior of the optical module 1 in FIG. 1. The optical module 1 is internally equipped with a printed circuit board (PCB) 18 on which the driver IC 14 and the amplifier 16 (FIG. 1) may be mounted. The printed circuit board 18 is connected to the transmitter optical subassembly 10 and the receiver optical subassembly 12 (FIG. 1) through the flexible printed circuit board (FPC) 20. The transmitter optical subassembly 10 or the receiver optical subassembly 12 and the flexible printed circuit board 20 are connected to a feedthrough 22 provided in the transmitter optical subassembly 10 or the receiver optical subassembly 12.

Figure 3:
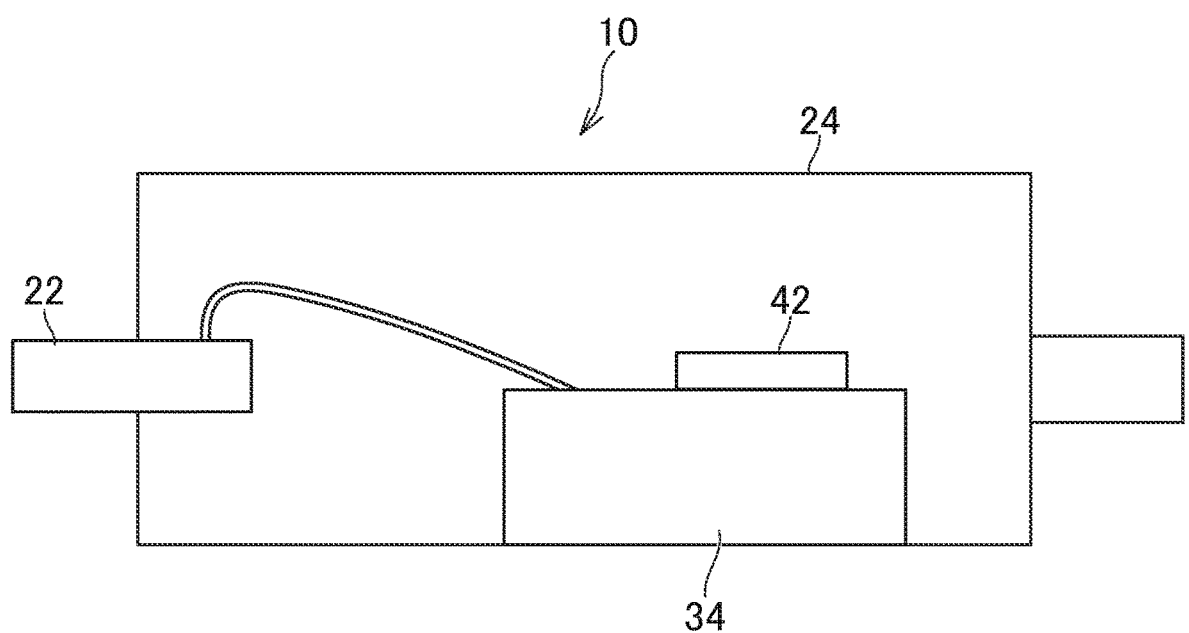
FIG. 3 is a conceptual diagram of a cross section structure of the transmitter optical subassembly.
Figure 4:
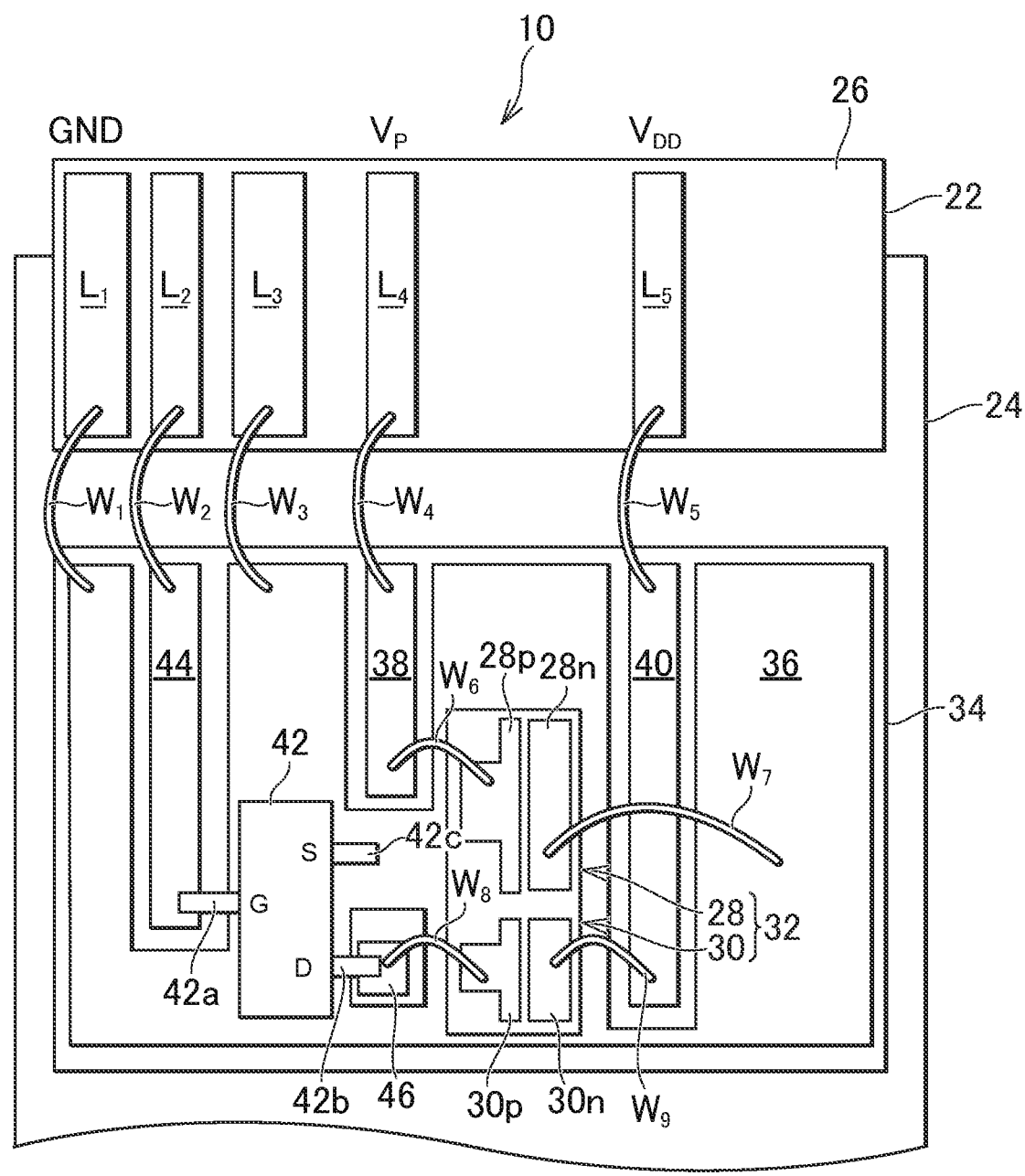
FIG. 4 is a plan view of an interior of the transmitter optical subassembly in FIG. 3.

FIG. 3 is a conceptual diagram of a cross section structure of the transmitter optical subassembly 10. FIG. 4 is a plan view of an interior of the transmitter optical subassembly 10 in FIG. 3.

The transmitter optical subassembly 10 has a package 24 made from metal and in a box shape. The feedthrough 22 has an electrical connection function to and from the package 24. The feedthrough 22 includes a ceramic substrate 26 having a surface on which some traces (Interconnect Line) $L_1$-$L_5$ are formed. The ceramic substrate 26 on its back has an unillustrated ground plane. The trace $L_1$ is connected to the ground plane through an unillustrated via.

The package 24 contains a light source 28 and an optical modulator 30. The optical modulator 30 is placed to modulate output light from the light source 28. The optical modulator 30 has a characteristic that a current depending on amount of optical absorption has a positive correlation with (e.g. is proportionate to) an applied voltage thereto. The light source 28 is a semiconductor laser (laser diode) and the optical modulator 30 is an electro-absorption optical modulator (EA modulator). These are monolithically integrated into an electro-absorption optical modulator integrated laser (EA-DFB-LD) 32, which is mounted on a submount 34 made from ceramic and is contained in the package 24.

On the submount 34 is formed an interconnect pattern. The submount 34 and the feedthrough 22 are electrically connected with wires $W_1$-$W_5$. The submount 34 on its surface has a ground pattern 36 connected to ground potential (GND). The submount 34 on its back has an unillustrated ground plane. The ground pattern 36 is connected to the unillustrated ground plane through an unillustrated via.

The electro-absorption optical modulator integrated laser 32 (light source 28 and optical modulator 30) is mounted on the submount 34 and bonded by soldering or brazing. The electro-absorption optical modulator integrated laser 32 on its surface has p-type electrodes 30p, 28p and n-type electrodes 30n, 28n of the optical modulator 30 and the light source 28, respectively. Such a structure may be implemented by forming the optical modulator 30 and the light source 28 on an surface of a semi-insulating semiconductor substrate, for example.

The submount 34 has a light source power line 38 formed thereon for providing a light source power source $V_P$ to the light source 28. The p-type electrode 28p of the light source 28 and the light source power line 38 are connected with a wire $W_6$. The feedthrough 22 has a trace $L_4$ for being connected to the light source power source $V_P$. The trace $L_4$ and the light source power line 38 are connected with the wire $W_4$. The n-type electrode 28n of the light source 28 are connected to the ground pattern 36 with a wire $W_7$. The ground pattern 36 is connected to the traces $L_1$, $L_3$ of the feedthrough 22 with the wires $W_1$, $W_3$.

The submount 34 has a drive line 40 for applying a reverse bias to the optical modulator 30. The n-type electrode 30n of the optical modulator 30 and the drive line 40 are connected with a wire $W_9$. The feedthrough 22 has a trace $L_5$ for applying a drive voltage $V_{DD}$. The trace $L_5$ and the drive line 40 are connected with the wire $W_5$.

Figure 5:
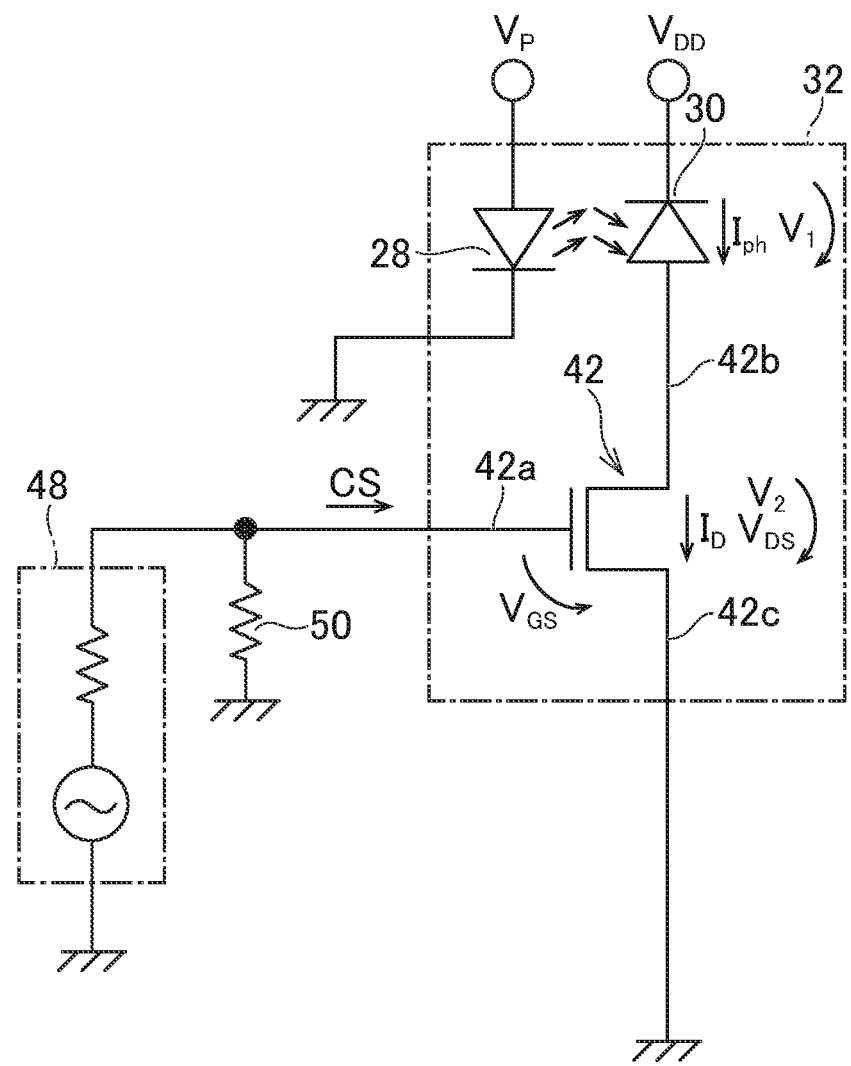
FIG. 5 is a diagram of an equivalent circuit of the transmitter optical subassembly in the embodiment.

The submount 34 has a transistor 42 (e.g. field-effect transistor) mounted thereon. The transistor 42 has a first terminal 42a (gate), a second terminal 42b (drain), and a third terminal 42c (source). As shown in FIG. 5, a control signal CS (e.g. voltage signal) input to the first terminal 42a serves to pass a current $I_D$ between the second terminal 42b and the third terminal 42c. The first terminal 42a, the second terminal 42b, and the third terminal 42c are connected the signal line 44, the pad 46, and the ground pattern 36, respectively, for transmitting electric signals (high frequency signals). The signal line 44 is connected to a trace $L_2$ of the feedthrough 22 with the wire $W_2$. The pad 46 is connected to the p-type electrode 30p of the optical modulator 30 with a wire $W_8$. The wire $W_8$ connects the transistor 42 at the second terminal 42b and the optical modulator 30 in series. To shorten the wire $W_8$, the transistor 42 and the optical modulator 30 are preferably as close as possible.

FIG. 5 is a diagram of an equivalent circuit of the transmitter optical subassembly 10 in the embodiment. The first terminal 42a (gate) of the transistor 42 is connected to a signal source 48 for receiving the control signal CS (high frequency signal). The control signal CS may be amplified by a driver IC (not shown). The first terminal 42a is connected to a terminal resistor 50 for preventing the control signal CS from being reflected.

The light source 28 is connected to the light source power source $V_P$ and the ground potential GND to emit light by a current flowing therethrough. The transistor 42 is an n-type MOSFET (Metal-Oxide-Semiconductor Field-Effect Transistor). The transistor 42 and optical modulator 30, which are connected to each other in series, are connected to the drive voltage $V_{DD}$ and the ground potential GND to apply a reverse bias to the optical modulator 30. Receiving light from the light source 28 and based on the voltage applied thereto, a current $I_{ph}$ runs through the optical modulator 30. The current $I_{ph}$ is equivalent to a current $I_D$ flowing between the second terminal 42b (drain) and the third terminal 42c (source) of the transistor 42.

The optical modulator 30 and the transistor 42 are connected in series; the drive voltage $V_{DD}$ applied thereto is set to be divided into a first voltage $V_1$ applied to the optical modulator 30 and a second voltage $V_2$ applied to the transistor 42. The drive current (current $I_{ph}$, current $I_D$)

running through the optical modulator 30 and the transistor 42 depends on the control signal CS to be input to the first terminal 42a. The first voltage $V_1$ is based on the drive current (current $I_{ph}$, current $I_D$) and is subject to the characteristic of the optical modulator 30. The second voltage $V_2$ fluctuates in response to the first voltage $V_1$.

Hereinafter, operation and control of the optical modulator 30 will be explained. In the embodiment, the optical modulator 30 partially absorbs light from the light source 28, thereby modulating output light. Depending on consumption amount of light of the optical modulator 30, the output light is regulated to be at a high-level or a low-level of optical output intensity. The characteristic of the optical modulator 30 is exemplified by an extinction ratio (ER) or optical modulation amplitude (OMA).

The consumption amount of light depends on the current $I_{ph}$. Keeping the current $I_{ph}$ unchanged enables the consumption amount of light or the OMA to be at a constant value. The optical output intensity of light from the light source 28, i.e. the optical output intensity of light input to the optical modulator 30 is assumed to be kept constant. This enables the extinction ratio to be kept constant. In the embodiment, the characteristic of the transistor 42 is utilized to keep the current $I_{ph}$ at a desired value. Its operation is explained below.

Figure 6:
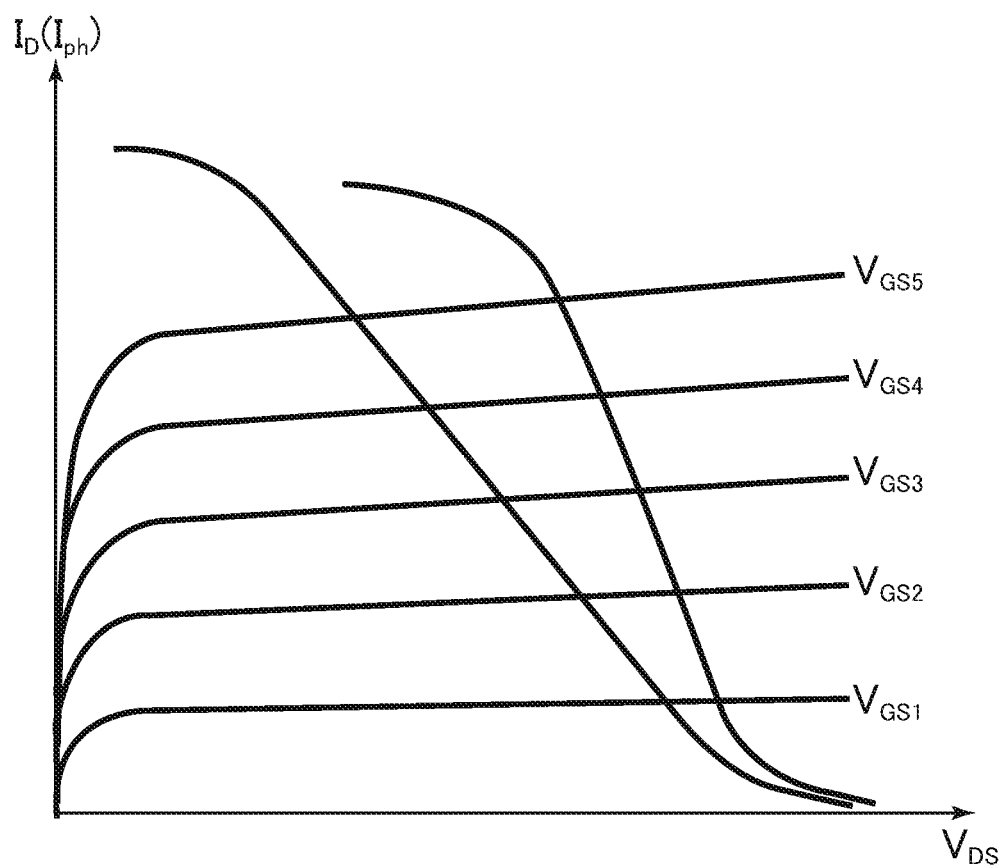
FIG. 6 is a diagram to explain operation of the transmitter optical subassembly in the embodiment.

FIG. 6 is a diagram to explain operation of the transmitter optical subassembly 10 in the embodiment. Specifically, the drive voltage $V_{DD}$ is 3 V; a relation between the drain-to-source voltage $V_{DS}$ and the current $I_D$ is shown for each gate-to-source voltage $V_{GS}$ ($V_{GS1}$-$V_{GS5}$). The transistor 42 has a characteristic that the current $I_D$, which flows in response to the gate-to-source voltage $V_{GS}$, is almost kept constant, irrespective of the drain-to-source voltage $V_{DS}$. The current $I_D$ is proportionate to the gate-to-source voltage $V_{GS}$.

The transmitter optical subassembly 10 in the embodiment has a reference value that the optical output intensity of the light source 28 is 10 mW, the extinction ratio of the optical modulator 30 is 11.82 dB, and the OMA is 7.48 dBm. The first voltage $V_1$ to be applied to the optical modulator 30 is settable by changing the gate-to-source voltage $V_{GS}$. Changing the gate-to-source voltage $V_{GS}$ can control the current $I_D$ flowing between the second terminal 42b and the third terminal 42c. The gate-to-source voltage $V_{GS}$, without reaching a threshold of the transistor 42, cannot enable the current $I_D$ to flow between the second terminal 42b and the third terminal 42c, whereby no effectively voltage is applied to the optical modulator 30 and the current $I_{ph}$ hardly flows.

With an increase in the gate-to-source voltage $V_{GS}$, the current $I_D$ flowing between the second terminal 42b and the third terminal 42c rises, boosting the first voltage $V_1$ effectively applied to the optical modulator 30. With an increase in the drain-to-source voltage $V_{DS}$ (second voltage $V_2$), the first voltage $V_1$ effectively applied to the optical modulator 30 declines. Or, with a decrease in the drain-to-source voltage $V_{DS}$ (second voltage $V_2$), the first voltage $V_1$ applied to the optical modulator 30 rises. The optical modulator 30 passes the current $I_{ph}$ in accordance with the first voltage $V_1$ applied thereto. The current $I_{ph}$ nonlinearly varies depending on the first voltage $V_1$. Accordingly, with the drain-to-source voltage $V_{DS}$ (second voltage $V_2$) kept high, the first voltage $V_1$ applied to the optical modulator 30 is made low, whereby the current $I_{ph}$ is made low in absolute value. As the drain-to-source voltage $V_{DS}$ (second voltage $V_2$) becomes lower, the current $I_{ph}$ becomes larger in absolute value. By changing two absorption modes of the optical modulator 30 in response to the high-level and the low-level of the output light, the output light is modulated and generated to be indicative of "1" and "0".

The transmitter optical subassembly 10 in the embodiment has a reference value that the high-level and the low-level of the output light are respectively 5 mA and 12 mA with the current $I_{ph}$ and are respectively 4.002 mW and 9.6054 mW with the consumption amount of light. The optical modulator 30 has a length of 200 µm; its output light has a wavelength of 1.55 µm. The first voltage $V_1$ applied to the optical modulator 30 is turned out to be 0.5 V at the high-level and 1.2 V at the low-level. During actual manufacturing processes, an initial adjustment only requires setting the gate-to-source voltage $V_{GS}$ while the current $I_{ph}$ and the extinction ratio are really being measured, making it unnecessary to gauge the first voltage $V_1$.

Higher environmental temperature of the optical modulator makes the optical modulator 30 have an absorption characteristic of absorbing more; that is, an absorption coefficient is made greater at the same applied voltage. Optical output intensity of the light source 28 shall be kept at a constant value by existing means such as auto power control (APC). With the optical output intensity of the light source 28 kept constant and with the absorption coefficient of the optical modulator 30 made greater, conventional transmitter optical subassemblies may have the absorption amount larger (current $I_{ph}$ larger) and have the extinction ratio and the OMA changed, without changing the first voltage $V_1$ applied to the optical modulator 30.

By contrast, the embodiment includes the optical modulator 30 connected to the transistor 42, whereby the drain-to-source voltage $V_{DS}$ is changeable irrespective of the current $I_D$, due to its characteristic. The change of the drain-to-source voltage $V_{DS}$ (second voltage $V_2$) leads to change of the first voltage $V_1$, whereby the current $I_{ph}$ is kept unchanged. The high-level and the low-level of the first voltage $V_1$ turn out to be 0.4 V and 0.96 V respectively, being close to the reference value.

As describe above, utilization of the characteristic of the transistor 42 enables the control to keep constant the current $I_{ph}$ flowing through the optical modulator 30 and keep constant the consumption amount of light. The control is an active control utilizing the characteristic of the transistor 42, without feedback or feed-forward from monitor values, eliminating a control circuit for the feedback or the feed-forward, contributing to downsizing. Additionally, during production processes, only the gate-to-source voltage $V_{GS}$ for an initial value needs to be set, necessitating fewer individual adjustments, contributing to a lower cost. The conventional control means change the first voltage $V_1$ itself applied to the optical modulator 30, in response to the high-level and the low-level of the output light, to assume control of keeping the extinction ratio constant. By contrast, the embodiment can effectively change the first voltage $V_1$ actually applied to the optical modulator 30, by utilizing the characteristic of the transistor 42, without changing the gate-to-source voltage $V_{GS}$ in response to each of the high-level and the low-level, with the reference value kept unchanged.

In the embodiment, the optical output intensity of the light source 28 is controlled constant. However, this works well for OMA specifications, without the control of the optical output intensity, because the consumption amount of light is kept at the initial value.

The characteristic ($V_{DS}$-$I_D$ characteristic) of the transistor 42 shows that the current $I_D$ is almost constant but slightly slopes when the gate-to-source voltage $V_{GS}$ is high. In spite of the slope, which may account for slight variation in the current $I_{ph}$, the variation in the current $I_{ph}$ (consumption amount of light) falls well within a range of the OMA specifications and extinction ratio specifications and causes no practical problem because the specifications allow for a margin. The transistor 42 may be a junction type field-effect transistor, a bipolar transistor, or a thin film transistor.

The embodiment enables simple control of the first voltage $V_1$ applied to the optical modulator 30, keeping the current $I_{ph}$ constant, leading to constancy of the extinction ratio and the OMA. Recently, pulse amplitude modulation-4 (PAM4) has begun to be used to implement greater capacity. The PAM4 operation using the electro-absorption optical modulator integrated laser 32 requires an adjustment of the voltage to be applied to the optical modulator 30 to make the optical transmission waveform at regular intervals of signal levels. The electro-absorption optical modulator integrated lasers 32 have respective different characteristics, requiring respective adjustments, leading to higher costs and lower productivity. By contrast, the embodiment only requires determination of four gate-to-source voltages $V_{GS}$ for initial values, thereby enabling spontaneous control to keep the regular intervals of the signal levels (keeping the extinction ratio and the OMA constant), greatly contributing to cost reduction in production processes.

Figure 7:
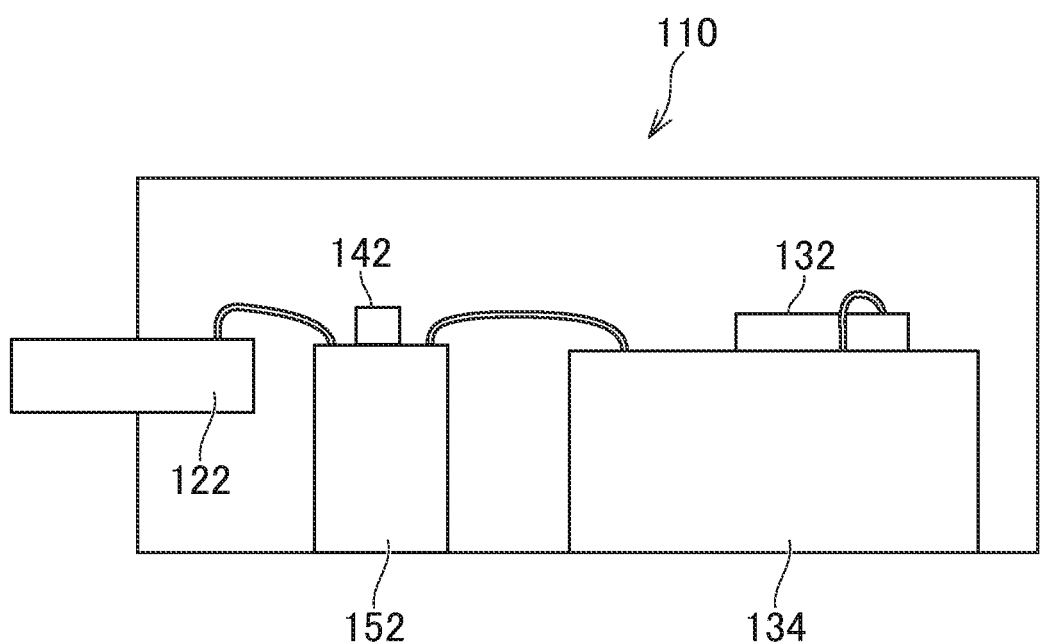
FIG. 7 is a conceptual diagram of a cross section structure of the transmitter optical subassembly in variation 1 of the embodiment.

FIG. 7 is a conceptual diagram of a cross section structure of the transmitter optical subassembly 110 in variation 1 of the embodiment. The variation is different from the embodiment in that a relay board 152 is provided between the feedthrough 122 and the submount 134. The content of the embodiment is applied herein.

In the variation, the transistor 142 is mounted not on the submount 134 but on the relay board 152. The electro-absorption optical modulator integrated laser 132 is a heating element, making it likely to transmit its heat to the transistor 142 if it is mounted on the submount 134. The more the temperature of the transistor 142 changes, the more the $V_{DS}$-$I_D$ characteristic changes. This is why the variation has the transistor 142 on the relay board 152, not on the submount 134 on which is mounted the electro-absorption optical modulator integrated laser 132. This can diminish an impact of heat transfer from the electro-absorption optical modulator integrated laser 132. The transistor 142 may be placed anywhere between the signal source 48 in FIG. 5 and the optical modulator 30 to achieve the effect although it is to be desired to place it as close to the optical modulator 30 as possible for more stable operation.

While there have been described what are at present considered to be certain embodiments, it will be understood that various modifications may be made thereto, and it is intended that the appended claims cover all such modifications as fall within the true spirit and scope of the invention. For example, in spite of the embodiment where the EA modulator and the semiconductor laser are monolithically integrated, these can be separated from each other to achieve the effect of the invention.

What is claimed is:

1. A transmitter optical subassembly comprising:
   a light source;
   an optical modulator for modulating output light from the light source, the optical modulator having a characteristic that a current depending on an amount of optical absorption has a positive correlation with an applied voltage thereto;
   a transistor with a first terminal, a second terminal, and a third terminal, configured to pass a current between the second terminal and the third terminal based on a control signal input to the first terminal, wherein
   the transistor at the second terminal is connected in series to the optical modulator,
   a drive voltage applied to the optical modulator and the transistor is divided into a first voltage applied to the optical modulator and a second voltage applied to the transistor,
   a drive current flowing through the optical modulator and the transistor depends on the control signal input to the first terminal,
   the first voltage is based on the drive current and is subject to the characteristic of the optical modulator, and
   the second voltage fluctuates based on the first voltage; and
   a package that houses a submount,
   wherein the optical modulator and the transistor are mounted on the submount, and
   wherein the third terminal is adjacent to the optical modulator.

2. The transmitter optical subassembly according to claim 1, wherein
   the transistor is a field-effect transistor, and
   the control signal is a voltage signal.

3. The transmitter optical subassembly according to claim 1, wherein the light source is also mounted on the submount.

4. The transmitter optical subassembly according to claim 1, wherein the light source and the optical modulator are monolithically integrated.

5. The transmitter optical subassembly according to claim 1, wherein the package is made of material that is different than a material of the submount.

6. An optical module comprising;
   a receiver optical subassembly; and
   a transmitter optical subassembly comprising:
     a light source;
     an optical modulator for modulating output light from the light source;
     a transistor with a first terminal, a second terminal, and a third terminal, configured to pass a current between the second terminal and the third terminal based on a control signal input to the first terminal,
     wherein the transistor at the second terminal is connected in series to the optical modulator; and
   a package that houses a submount,
     wherein the light source, the optical modulator, and the transistor are mounted on the submount, and
     wherein the third terminal is adjacent to the optical modulator.

7. The optical module according to claim 6, wherein the transistor is an n-type metal-oxide-semiconductor field-effect transistor.

8. The optical module according to claim 6, wherein the light source and the optical modulator are monolithically integrated.

9. The optical module according to claim 6, wherein the control signal is a voltage signal.

10. The optical module according to claim 6, wherein the package is made of a material that is different than a material of the submount.

11. The optical module according to claim 6, wherein the submount includes a light source power line formed thereon for providing a light source power source to the light source.

12. The optical module according to claim 11, wherein the third terminal is arranged between the light source power line and the second terminal.

13. A transmitter optical subassembly comprising:
a light source;
an optical modulator for modulating output light from the light source;
a transistor with a first terminal, a second terminal, and a third terminal, configured to pass a current between the second terminal and the third terminal based on a control signal input to the first terminal,
    wherein the transistor at the second terminal is connected in series to the optical modulator; and
a package that houses a submount,
    wherein the light source, the optical modulator, and the transistor are mounted on the submount, and
    wherein the third terminal is adjacent to the optical modulator.

14. The transmitter optical subassembly according to claim 13, wherein
a drive voltage applied to the optical modulator and the transistor is divided into a first voltage applied to the optical modulator and a second voltage applied to the transistor,
a drive current flowing through the optical modulator and the transistor depends on the control signal input to the first terminal,
the first voltage is based on the drive current, and
the second voltage fluctuates based on the first voltage.

15. The transmitter optical subassembly according to claim 13, wherein the light source is a laser diode, the optical modulator is an electro-absorption optical modulator, and the transistor is a field-effect transistor.

16. The transmitter optical subassembly according to claim 15, wherein the laser diode and the electro-absorption optical modulator are integrated into an electro-absorption optical modulator integrated laser.

17. The transmitter optical subassembly according to claim 13, wherein the control signal is a voltage signal.

18. The transmitter optical subassembly according to claim 13, wherein the light source and the optical modulator are monolithically integrated.

19. The transmitter optical subassembly according to claim 13, wherein the package is made of a material that is different than a material of the submount.

20. The transmitter optical subassembly according to claim 13, wherein the submount includes a light source power line formed thereon for providing a light source power source to the light source, and
    wherein the third terminal is arranged between the light source power line and the second terminal.

* * * * *